(12) United States Patent
Liao

(10) Patent No.: US 8,226,112 B2
(45) Date of Patent: Jul. 24, 2012

(54) GOLF BAG CART FOLDABLE DEVICE

(75) Inventor: Gordon Liao, Yung Kang (TW)

(73) Assignee: Unique Product & Design Co., Ltd., Yung Kang, Tainan Hsien (TW)

( * ) Notice: Subject to any disclaimer, the term of this patent is extended or adjusted under 35 U.S.C. 154(b) by 252 days.

(21) Appl. No.: 12/752,375

(22) Filed: Apr. 1, 2010

(65) Prior Publication Data

US 2011/0241314 A1    Oct. 6, 2011

(51) Int. Cl.
*B62B 3/02* (2006.01)
(52) U.S. Cl. ............... 280/651; 280/47.34; 280/DIG. 6
(58) Field of Classification Search .............. 280/35, 280/38, 43.13, 43.15, 43.16, 47.131, 47.15, 280/47.16, 47.17, 47.2, 47.19, 47.24, 47.315, 280/47.26, 47.34, 47.371, 504, 511, 443, 280/492, 638, 639, 647, 651, DIG. 3, DIG. 5, 280/DIG. 6; 180/19.2, 21, 24, 24.02, 24.03
See application file for complete search history.

(56) References Cited

U.S. PATENT DOCUMENTS

| | | | | | |
|---|---|---|---|---|---|
| 2,806,709 | A | * | 9/1957 | Watson | 280/38 |
| 4,455,030 | A | * | 6/1984 | Rosen | 280/47.19 |
| 5,180,184 | A | * | 1/1993 | Chiu | 280/646 |
| 6,079,718 | A | * | 6/2000 | Liao | 280/47.26 |
| 6,152,463 | A | * | 11/2000 | Wu | 280/47.17 |
| 6,510,927 | B1 | * | 1/2003 | Wu | 188/31 |
| 6,739,616 | B2 | * | 5/2004 | Lin | 280/642 |
| 7,063,340 | B1 | * | 6/2006 | Wu | 280/47.26 |
| 7,128,333 | B2 | * | 10/2006 | Reimers et al. | 280/651 |
| 7,137,644 | B2 | * | 11/2006 | Kimberley | 280/651 |
| 7,527,283 | B2 | * | 5/2009 | Horacek | 280/642 |
| 7,552,931 | B2 | * | 6/2009 | Liao | 280/47.34 |
| 7,862,053 | B2 | * | 1/2011 | Liao | 280/47.34 |
| 2003/0122353 | A1 | * | 7/2003 | Liao | 280/651 |
| 2006/0192366 | A1 | * | 8/2006 | Kimberley | 280/651 |
| 2009/0309334 | A1 | * | 12/2009 | Liao | 280/639 |
| 2010/0059948 | A1 | * | 3/2010 | Liao | 280/42 |
| 2010/0090443 | A1 | * | 4/2010 | Liao | 280/651 |
| 2011/0175331 | A1 | * | 7/2011 | Zhang | 280/651 |
| 2011/0181027 | A1 | * | 7/2011 | Zhang | 280/651 |
| 2011/0215542 | A1 | * | 9/2011 | Wang | 280/35 |
| 2011/0241315 | A1 | * | 10/2011 | Liao | 280/651 |
| 2011/0316258 | A1 | * | 12/2011 | Lin | 280/651 |

* cited by examiner

*Primary Examiner* — John R Olszewski
*Assistant Examiner* — Brodie Follman
(74) *Attorney, Agent, or Firm* — Alan Kamrath; Kamrath IP Lawfirm, PA

(57) ABSTRACT

A foldable device of golf bag cart comprises: an upper cart stand, a bottom cart stand and a linkage set. The upper cart stand, having an adapter that is provided with a slider on its top, is provided with a slider mount at each of the two distant ends above and below the slider. The bottom cart stand is in pinned connection with the adapter at its top. The linkage set, made up of a plurality of linkages, forms links between the slider and the bottom cart stand, between the adapter and the rear wheel frame and between the bottom cart stand and the front wheel frame. By means of the setup of such links, the simultaneous unfolding or folding of the upper cart stand, the bottom cart stand, the front wheel and the rear wheels can thus be accomplished, which facilitates the handiness in use.

4 Claims, 10 Drawing Sheets

GOLF BAG CART FOLDABLE DEVICE

BACKGROUND OF THE INVENTION

1. Field of the Invention

This invention relates to a golf bag cart foldable device and more particularly to one that features a simultaneous unfolding or folding for an upper cart stand, a bottom cart stand, a front wheel and rear wheels to facilitate the handiness in use.

2. Description of the Prior Art

The foldable devices of prior golf bag carts have a common structure as in FIG. 10, where an upper cart stand 7 (that is, the handle bar) and a rear wheel frame 71 are joined together by a strut bar 72 in between. Once the upper cart stand 7 is being pulled, the two rear wheels 73 are certainly linked to shift inward; however, the folding of the front wheel 74 and of the rear wheel 73 are independent to each other, which are unable to be folded simultaneously. And that means a user has to squat down to operate the front wheel folding joint 75 and to pull the front wheel 74 for a frontward (or backward) folding, for the completion of the folding of the bag cart. Reversely, the unfolding of the cart for the use still demands a user to squat down to operate the front wheel 74 too, which is substantially inconvenient, especially for the situations that the front wheel 74 and the rear wheels 73 are stuck with dirt, weeds or/and mud as the cart has moved in the golf course. And the folding of the front wheel at this moment would no doubt smudge the hands and the dress, which is awful and awkward to operate.

In light of the aforesaid shortcomings, the applicant of this invention pushed the inventor laboriously ahead with the improvement, and eventually the longtime endeavors gave birth to this invention.

SUMMARY OF THE INVENTION

The objective of this invention is to provide a golf bag cart foldable device, which features a simultaneous unfolding or folding for a upper cart stand, a bottom cart stand, a front wheel and rear wheels, to achieve particular handiness in use.

To achieve the aforementioned objective, this invention comprises: an upper cart stand, having an adapter at its bottom, where the adapter is provided with a slider on its top, which is available to slide along the upper cart stand. The upper cart stand is provided with a slider mount at each of the two distant ends above and below the slider, and the slider is correspondingly set up with a lock mechanism. By means of the mutual locking between the lock mechanism and the slider mount, the slide is consequently able to be attached on the upper cart stand. The slider is in pinned connection with a rear wheel frame at each side, where the rear wheel frame is joined to a rear wheel at its distant end; a bottom cart stand, in pinned connection with the adapter at its top and connected to a bag base at its bottom; and a linkage set, made up of a plurality of linkages, which are joined to the upper cart stand, the bottom cart stand, the front wheel frame and the rear wheel frames respectively, where the distant end of the front wheel frame is joined to the front wheel, to form links between the slider and the bottom cart stand, between the adapter and the rear wheel frame and between the bottom cart stand and the front wheel frame; by means of the setup of such links, once the lock mechanism is released and the upper cart stand is pulled, the simultaneous unfolding or folding of the upper cart stand, the bottom cart stand, the front wheel and the rear wheels can thus be accomplished, to facilitate the handiness in use.

DETAILED DESCRIPTION OF THE INVENTION

Figure 1:
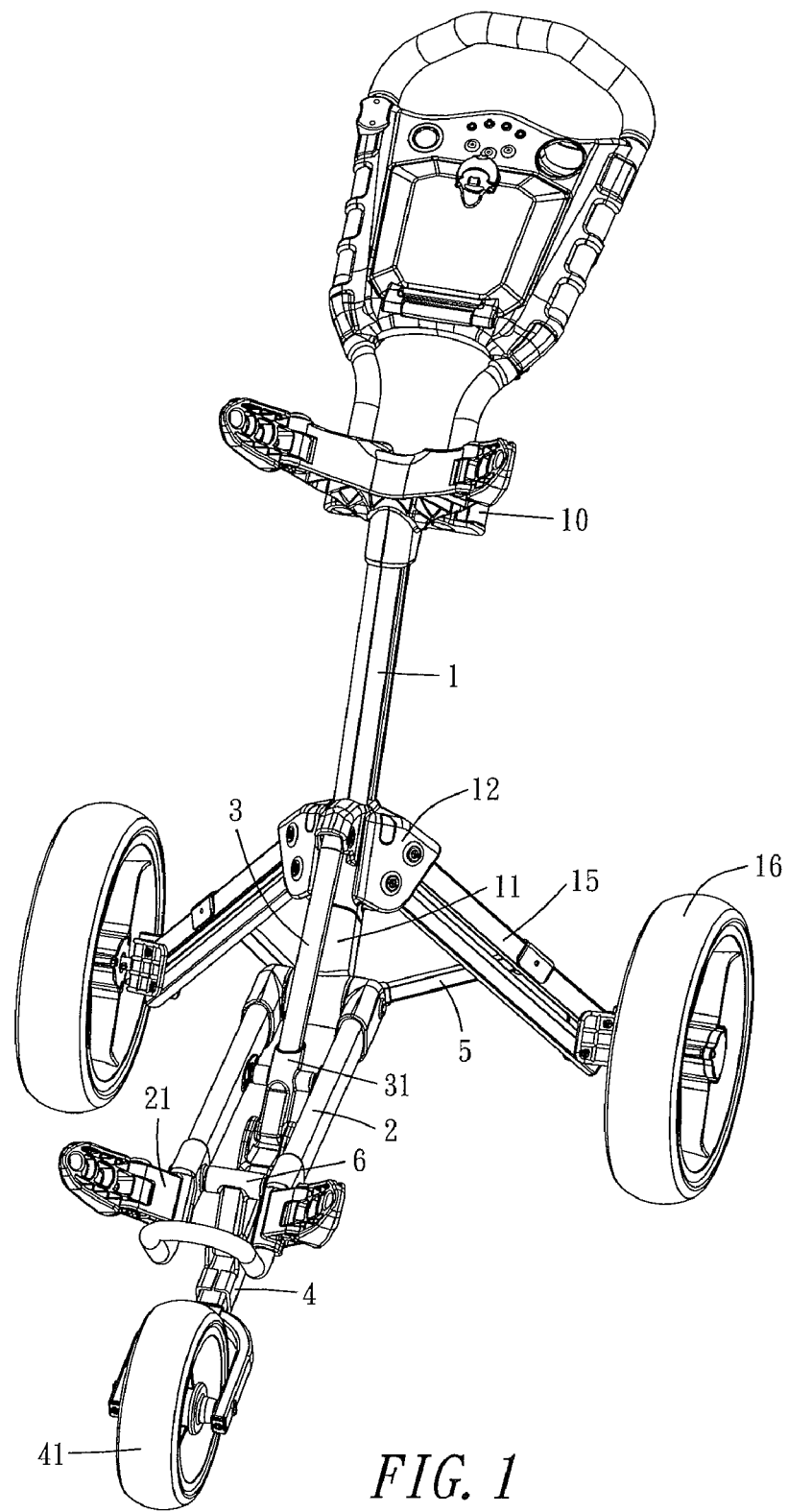
FIG. 1 is a three-dimensional diagram of the unfolding according to the present invention.
Figure 2:
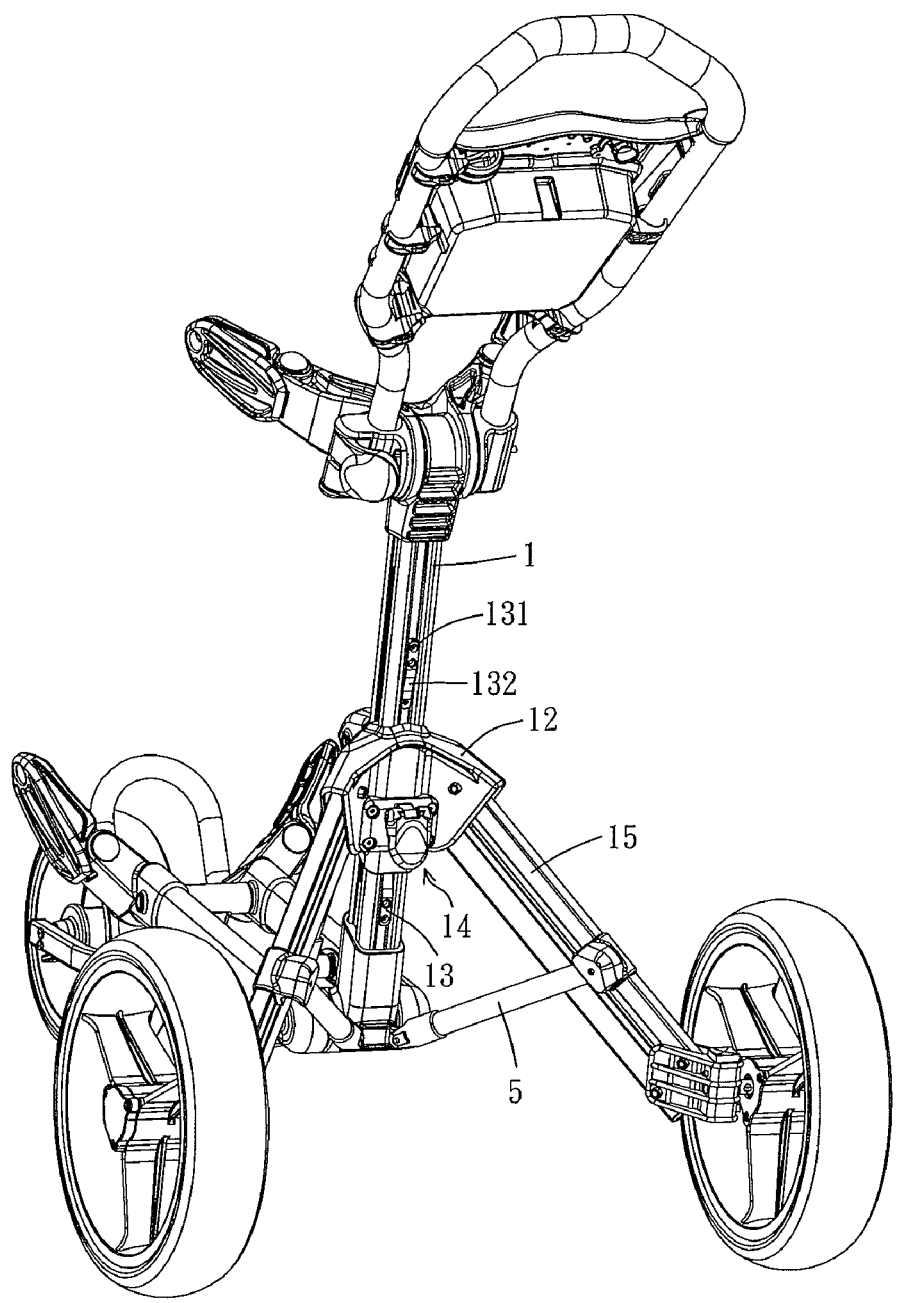
FIG. 2 is a three-dimensional back-lateral view of the unfolding according to the present invention.
Figure 3:
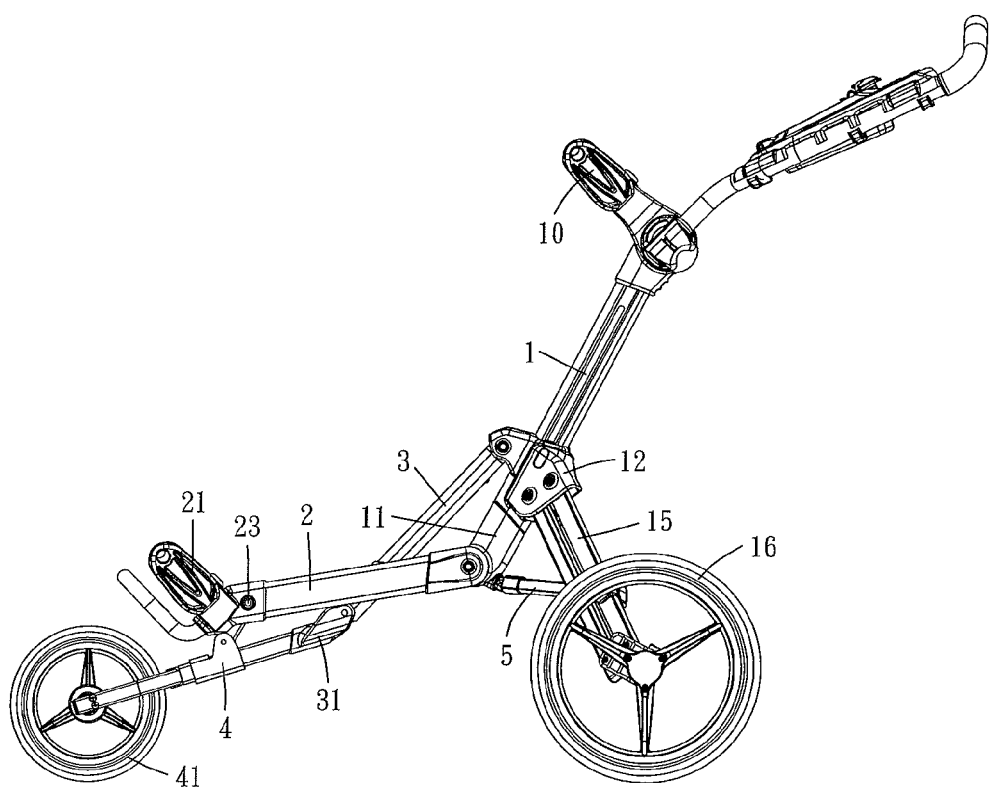
FIG. 3 is a side view of the unfolding according to the present invention.

The structural traits and the functions of this invention are detailed described with reference to the following preferred embodiment and the accompanying drawings, which would help the honorable Examiner to comprehend thoroughly the present invention.

Referring to FIGS. 1-6, this invention comprises:

an upper cart stand 1, having an upper bracket 10 at its top and an adapter 11 at its bottom, where the adapter 11 is provided with a slider 12 on its top, and the slider 12 is available to slide along the upper cart stand 1. The upper cart stand 1 is provided with a slider mount 13 at each of the two distant ends above and below the slider 12, where the slider mount 13 is provided with a fixing hole 131 and a ramp 132, and the slider 12 is correspondingly set up with a lock mechanism 14, which is made up of a buckle 141 pivotally connected to the slider 12, an elastic post 142 coupled to the buckle 141 and a spring 143 set up between the slider 12 and the elastic post 142. The slider 12 is in pinned connection with a rear wheel frame 15 at each side, where the rear wheel frame 15 is joined to a rear wheel 16 at its distant end; moreover, the upper cart stand 1 is provided with a springy element 17 internally, for instance, a spring, where its one end is fixed at the slider 12 while the other end at the bottom of the upper cart stand 1;

a bottom cart stand 2, in pinned connection with the adapter 11 at its top and having a bag base 21 at its bottom; and a linkage set 3, made up of a plurality of linkages, which are connected to the upper cart stand 1, the bottom cart stand 2, the front wheel frame 4 and the rear wheel frames 15 respectively, to form links between the slider 12 and the bottom cart stand 2, between the adapter 11 and the rear wheel frame 15 and between the bottom cart stand 2 and the front wheel frame 4, where the linkage set 3 comprises:

a first linkage 3, coupling to the slider 12 of the upper cart stand 1 at its top, having a winding member 31 at its bottom, where the winding member 31 is coupled to a hinge 22 of the bottom cart stand 2 at its top, to form a link between the slider 12 and the bottom cart stand 2, and the winding member 31 is coupled to the front wheel frame 4 at its bottom, where the front wheel frame 4 is connected to a front wheel 41 at its distant end;

a second linkage 5, connecting the adapter 11 of the upper cart stand 1 and each of the two rear wheel frames 15, to form links between the adapter 11 and each of the two rear wheel frames 15; and a third linkage 6, coupling to the other hinge 23 of the bottom cart stand 2 at its top;

and coupling to the front wheel frame 4 at its bottom, to form a link between the bottom cart stand 2 and the front wheel frame 4.

Figure 4:
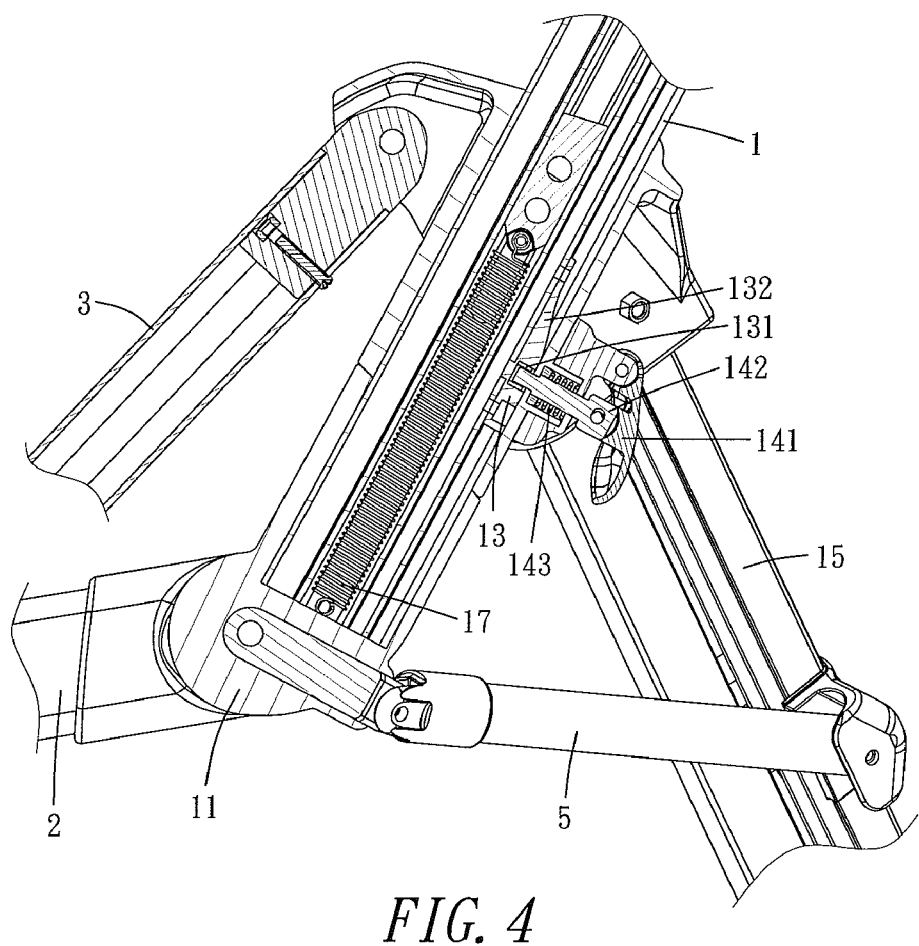
FIG. 4 is a schematic sectional view for the lock mechanism of the unfolding according to the present invention.
Figure 5:
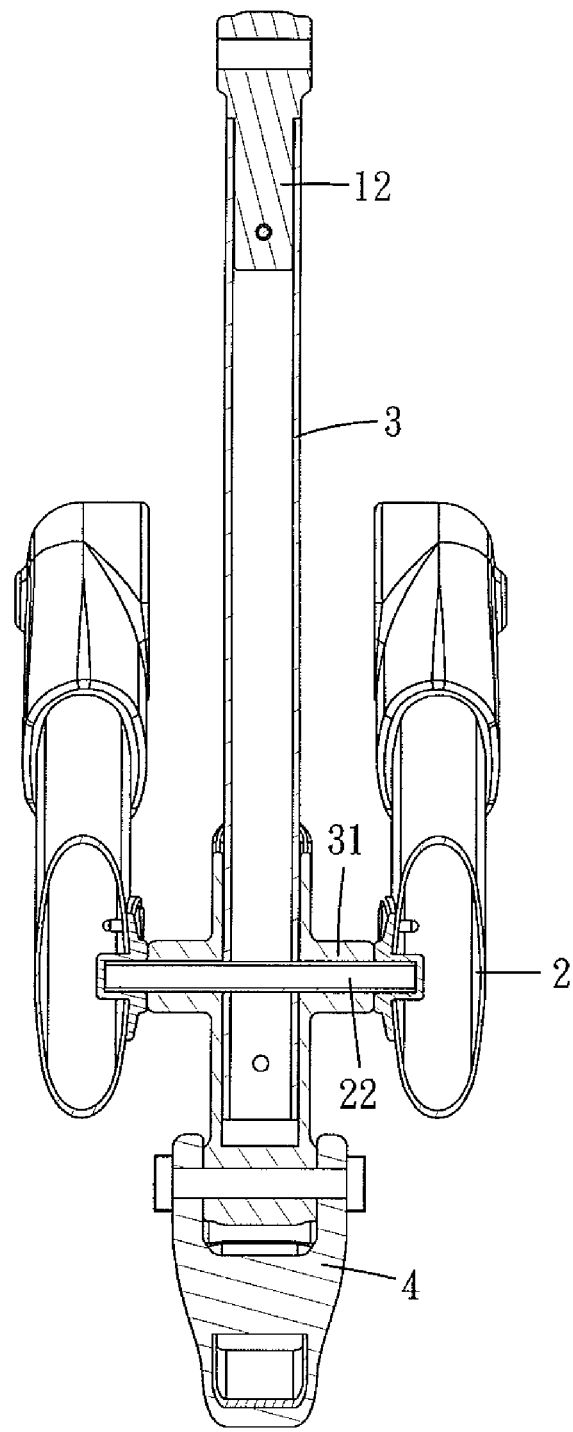
FIG. 5 is a schematic diagram of the link relation for the first linkage of the unfolding according to the present invention.
Figure 6:
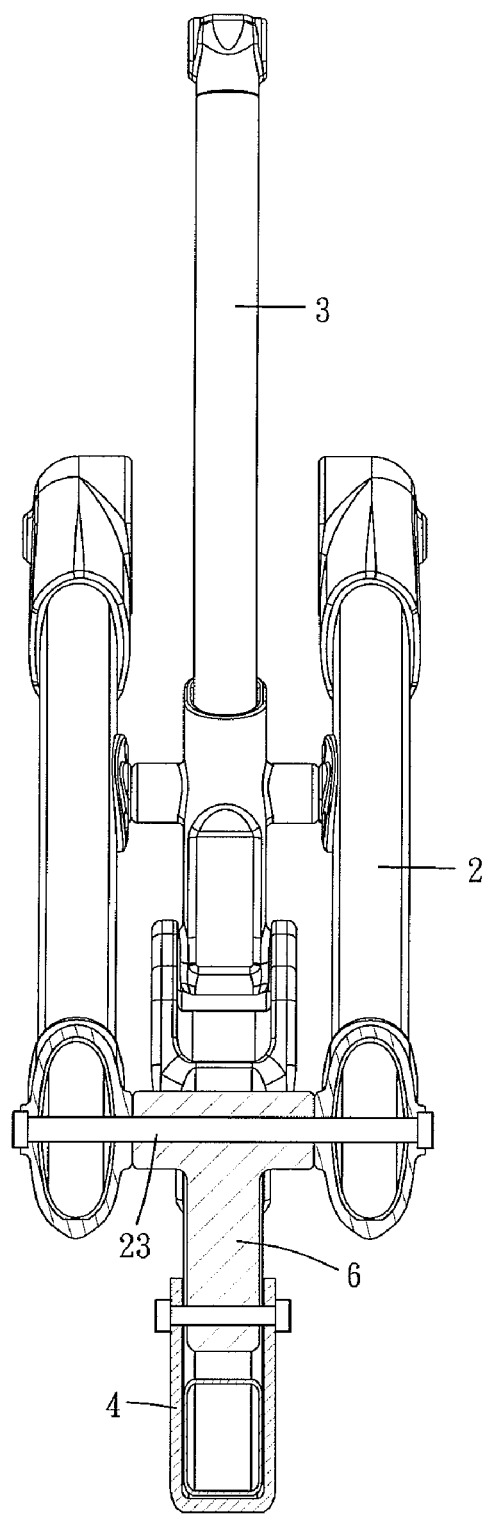
FIG. 6 is a schematic diagram of the link relation for the third linkage of the unfolding according to the present invention.

According to the aforementioned structural combination, once the golf bag cart of this invention is being unfolded, the elastic post 142 of the lock mechanism 14 is inserted in the fixing hole 131 of the slide mount 13, shown in FIG. 4, to have the slider 12 fixed firmly, and to anchor the slider 12 to the upper cart stand 1. Once the buckle 141 is being pulled open (release the lock mechanism 14), the elastic post is forced to move inward and to escape from the fixing hole 131, shown in FIG. 7; on the contrary, once the buckle 141 is released, the resilience of the spring 143 will push the buckle 141 and the elastic post 142 back in their places. Therefore, once the slider 12 is settled in a slider mount 13, the buckle 141 has to be pulled out first, to let go of the elastic post 142 from the fixing hole 131, and the slider 12 is sliding to the other slider mount 13, where the elastic post 142 is pressed down first by the ramp 132 of the slider mount 13 until an insertion at the fixing hole 131. Through the mutual locking of the lock mechanism 14 of the slider 12 and the slider mount 13, the slider 12 is anchored firmly on the upper cart stand 1.

Figure 7:
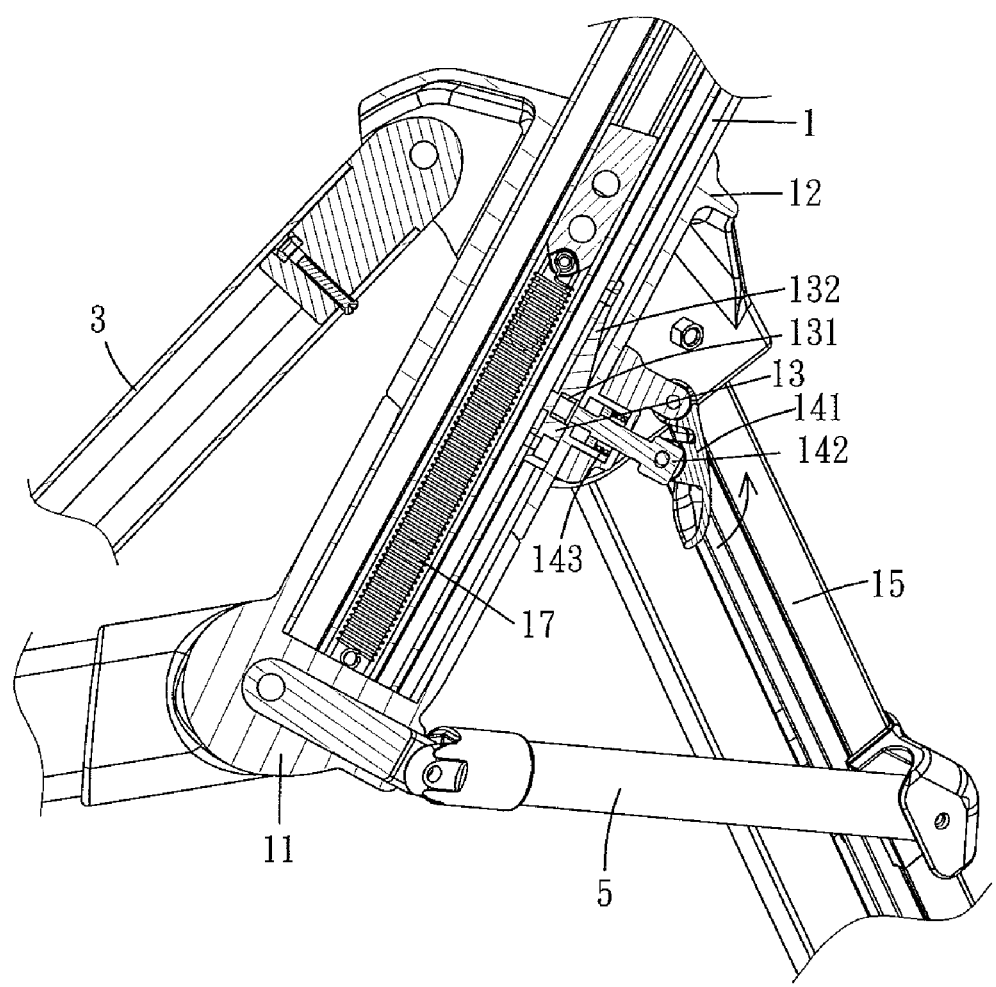
FIG. 7 is a schematic sectional view for the lock mechanism of the folding according to the present invention.
Figure 8:
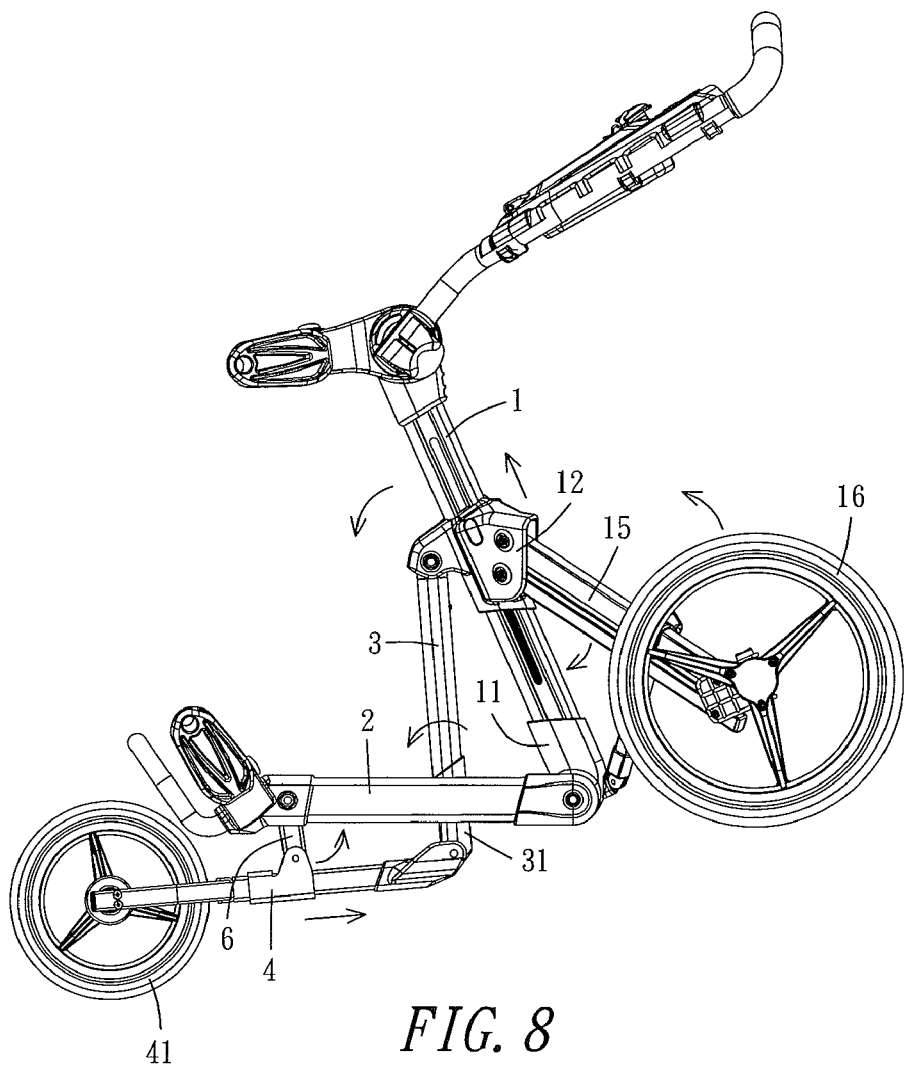
FIG. 8 is a schematic diagram of the side elevation for the motion of the folding according to the present invention.
Figure 9:
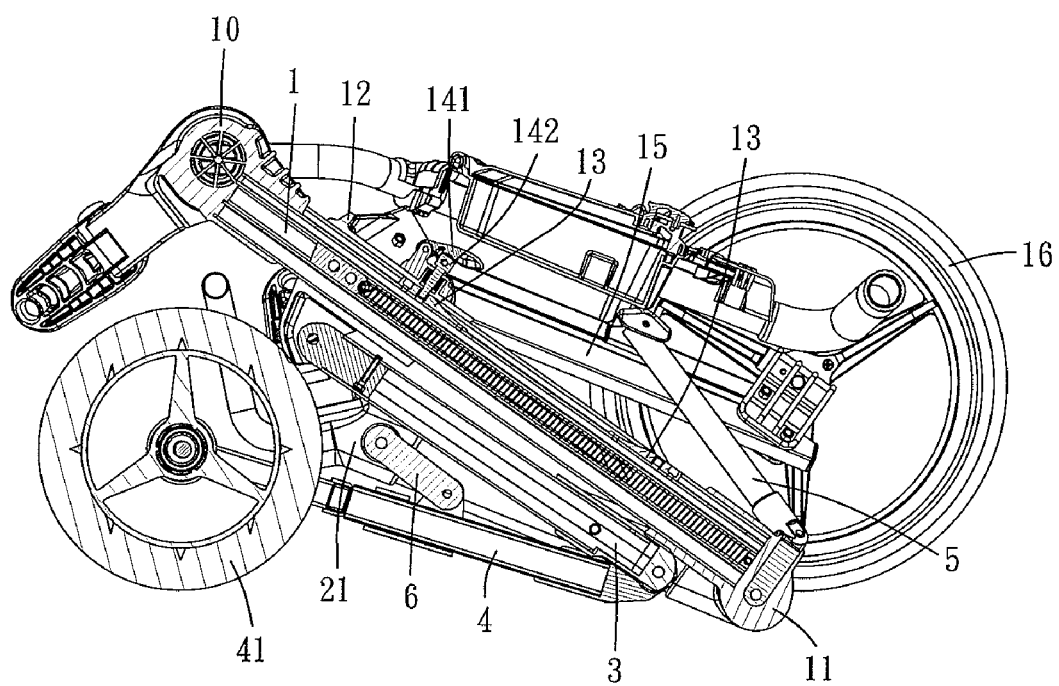
FIG. 9 is a schematic diagram of the complete folding according to the present invention.
Figure 10:
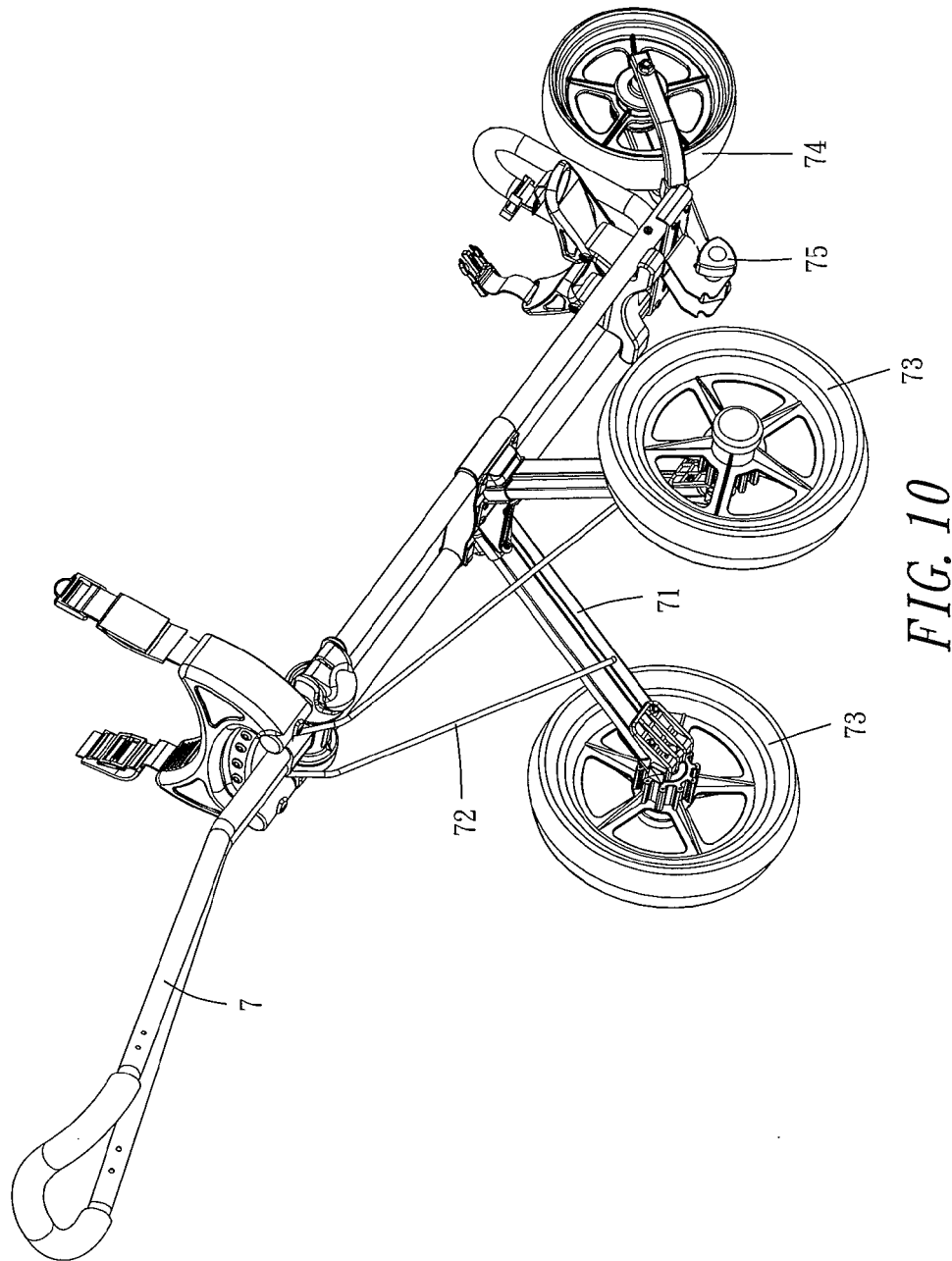
FIG. 10 is a three-dimensional view of the unfolding of a prior golf bag cart.

Once intending for a folding, shown in FIGS. 7 & 8, the buckle 41 is first pulled out (release the lock mechanism 14) and simultaneously the upper cart stand 1 is pushed frontward and upward. The slider 12 is pushed by the first linkage 3 to slide up along the upper cart stand 1; meanwhile, the rear wheel frames 15 is pushed by the slider 12 to move upward and inward by means of the link between the second linkage 5 and the rear wheel frames 15, which further drives the rear wheel 16 to fold upward and inward. Moreover, the moment the slider 12 is sliding up, the first linkage 3 is driven to swing, which pushes the front wheel frame 4 to move backward, and the front wheel frame 4 is shifted inward through the driving of the third linkage 6, to enable the front wheel 41 folded inward below the bag base 21, shown in FIG. 9, to accomplish the folding of the cart.

In short, once the lock mechanism 14 is released (pulling the buckle 141 out), and the upper cart stand 1 is pushed (or pulled) at the same time, the upper cart stand 1, the bottom cart stand 2, the front wheel 41 and the rear wheels 16 are able to be folded simultaneously, which facilitates substantially the handiness to operate.

On the contrary, once the golf bag cart is intended for an unfolding, the buckle 41 is pulled open and the upper cart stand 1 is pulled up, and by means of the link among the first linkage 3, the slider 12, the second linkage 5 and the rear wheel frame 15, the rear wheels 16 are then unfolded; meanwhile, through the link among the winding member 31 of the first linkage 3, the third linkage 6 and the front wheel frame 4, the front wheel 41 is able to be unfolded simultaneously. And further through the lock mechanism 14 to secure the slider 12, the upper cart stand 1 and the bottom cart stand 2 are locked into their relative positions, the front wheel 41 and the rear wheels 16 are able to be unfolded fixedly, which also facilitates substantially the handiness to operate.

It is worthy to mention one more time that the folding requires a pulling open on the buckle 141 and a pulling on the upper card stand 1, which will lessen the included angle between the upper cart stand 1 and the bottom cart stand 2 gradually, shown in FIG. 8, and the slider 12 is sliding up along the upper cart stand 1. Once it slides to the slider mount 13 at the top of the upper cart stand 1, and the elastic post 142 is pushed into the fixing hole 131, which will issue a sound, to remind the user that the folding is accomplished. Once the upper cart stand 1 and the bottom cart stand 2 are folded close to each other, the resilience of the stretched springy element 17 would not have them to unfold automatically. Moreover, due to the locking by the lock mechanism 14, the upper cart stand 1 and the bottom cart stand 2 may not possibly be pulled apart easily. On the contrary, during the unfolding, the buckle 141 is pulled to open and the upper card stand 1 is pulled upward, the slider 12 will slide toward the adapter 11 automatically back to its position, subject to the resilience of the stretched springy element 17, to support the required force during the unfolding. In short, a slight pull on the upper cart stand 1 is enough to unfold and anchor the cart, which substantially economize efforts and is extremely handy to operate.

From the aforesaid description, this invention features at least the following advantages and functions, which is much creative than the prior art:

1. The upper cart stand 1, the bottom cart stand 2, the front wheel 41 and the rear wheels 16 can be unfolded or folded simultaneously, which is truly handy in use.
2. During the folding of the cart, it is available to carry out the contraction in volume and the mutual locking of the slider 12 and the upper cart stand 1 enables a handy carrying.
3. During the unfolding, the lock mechanism 14 supports automatically to anchor the cart and there is no need for additional joints to be fixed, which is truly handy in use.
4. The upper cart stand 1 is provided with an extra springy element 17 internally, capable of supporting the unfolding of the cart, which facilitates the handiness to operate and also to save efforts.

To sum up, the disclosed concrete structure of the exemplified embodiment of the present invention is not only unknown to the prior art, but surely can accomplish the expected objective and function, which is construed as absolutely novel and creative, and a patent application for the invention is then filed according to the patent law.

What is claimed is:
1. A golf bag cart foldable device, comprising:
   a.) an upper cart stand, having an adapter at its bottom, where the adapter is provided with a slider on its top, which is available to slide along said upper cart stand, said upper cart stand being provided with a slider mount at each of its two distant ends above and below the slider, and the slider being correspondingly set up with a lock mechanism, by means of the mutual locking between the lock mechanism and the slider mount, the slider being consequently able to attach on said upper cart stand and being in pinned connection with a rear wheel frame at each side, where the rear wheel frame is joined to a rear wheel at its distant end;
   b.) a bottom cart stand, in pinned connection with the adapter at its top and connected to a bag base at its bottom; and
   c.) a linkage set, made up of a plurality of linkages, which are joined to said upper cart stand, said bottom cart stand, a front wheel frame and the rear wheel frames respectively, where the distant end of the front wheel frame is joined to a front wheel, to form links between the slider and said bottom cart stand, between the adapter and the rear wheel frame and between said bottom cart stand and the front wheel frame;

by means of the setup of said links, once the lock mechanism is released and said upper cart stand is pulled, the simultaneous unfolding or folding of said upper cart stand, said bottom cart stand, the front wheel and the rear wheels being thus accomplished, to facilitate the handiness in use.

2. A golf bag cart foldable device as in claim 1 wherein the slider mount is provided with a fixing hole and a ramp, and the lock mechanism comprising: a buckle pivotally connected to the slider, an elastic post coupled to the buckle and a spring set up between the slider and the elastic post.

3. A golf bag cart foldable device as in claim 1 wherein said upper cart stand has a springy element internally, and one end of the springy element being fixed to the slider while the other end to the bottom of said upper cart stand.

4. A golf bag cart foldable device as in claim 1 wherein said linkage set comprises:

a.) a first linkage, coupling to the slider of said upper cart stand at its top, having a winding member at its bottom, where the winding member is coupled to said bottom cart stand at its top and to the front wheel frame at its bottom, to form a link between the slider and said bottom cart stand;

b.) a second linkage, connecting the adapter of said upper cart stand and each of the two rear wheel frames, to form links between the adapter and each of the two rear wheel frames; and c.) a third linkage, coupling to said bottom cart stand at its top and to the front wheel frame at its bottom, to form a link between said bottom cart stand and the front wheel frame.

* * * * *